(12) United States Patent
Kenefake et al.

(10) Patent No.: US 7,763,085 B2
(45) Date of Patent: *Jul. 27, 2010

(54) APPARATUS FOR PRODUCING HYDROGEN

(75) Inventors: Dean Alan Kenefake, Sugar Land, TX (US); William Spencer Wheat, Missouri City, TX (US); Hongqiao Bruce Sun, Sugar Land, TX (US); Bhaskar Balasubramanian, Houston, TX (US); Vesna Radovan Mirkovic, Pearland, TX (US); Daniel Glenn Casey, Kingwood, TX (US)

(73) Assignee: Texaco Inc., San Ramon, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/027,587

(22) Filed: Feb. 7, 2008

(65) Prior Publication Data

US 2008/0127554 A1    Jun. 5, 2008

Related U.S. Application Data

(62) Division of application No. 11/015,588, filed on Dec. 17, 2004, now Pat. No. 7,354,464.

(51) Int. Cl.
*B01J 7/00* (2006.01)
*G05D 16/00* (2006.01)

(52) U.S. Cl. .............. 48/61; 48/75; 48/127.7; 422/112; 422/190; 422/191; 422/193; 700/271; 700/272

(58) Field of Classification Search ............ 422/190, 422/191, 193, 112; 48/127.7, 75, 61, 128; 700/271, 272, 273, 275
See application file for complete search history.

(56) References Cited

U.S. PATENT DOCUMENTS

| | | | |
|---|---|---|---|
| 4,047,904 A | 9/1977 | Worrall |
| 4,140,495 A | 2/1979 | Pietruszewski |
| 4,238,204 A | 12/1980 | Perry |
| 4,323,370 A | 4/1982 | Leitgeb |
| 4,598,836 A | 7/1986 | Wessel |

(Continued)

FOREIGN PATENT DOCUMENTS

WO    WO 2004/054013 A2    6/2004

(Continued)

*Primary Examiner*—Nina Bhat
(74) *Attorney, Agent, or Firm*—Melissa Patangia

(57) ABSTRACT

An apparatus and method for producing a hydrogen-enriched reformate. The apparatus includes a fuel processor for converting a fuel to a reformate having fluctuations in pressure and or flow rate, means for reducing the fluctuations, a compression unit for compressing the reformate and one or more of a purification unit and a storage unit downstream of a compression unit. Means for reducing the fluctuations in the reformate can include one or more of a buffer and a conduit for providing a controlled flow of a supplemental fluid to an inlet of the compression unit. The supplemental fluid can include the compressed reformate, a hydrogen-enriched reformate, and mixtures thereof. The apparatus can include means for regulating power to the compression unit that can incrementally increase power to the compression unit particularly during start up. The purification unit can include one or more of a hydrogen selective membrane and a pressure swing adsorption unit. Methods for producing hydrogen are also disclosed.

17 Claims, 4 Drawing Sheets

U.S. PATENT DOCUMENTS

| | | | |
|---|---|---|---|
| 4,690,695 A | 9/1987 | Doshi | |
| 4,693,730 A | 9/1987 | Miller et al. | |
| 4,725,293 A | 2/1988 | Gunderson | |
| 4,857,086 A | 8/1989 | Kawai | |
| 4,925,464 A | 5/1990 | Rabenau et al. | |
| 4,927,434 A | 5/1990 | Cordes et al. | |
| 4,995,889 A | 2/1991 | Abel et al. | |
| 5,042,994 A | 8/1991 | Smolarek | |
| 5,082,473 A | 1/1992 | Keefer | |
| 5,112,367 A | 5/1992 | Hill | |
| 5,256,174 A | 10/1993 | Kai et al. | |
| 5,258,056 A | 11/1993 | Shirley et al. | |
| 5,435,836 A | 7/1995 | Anand et al. | |
| 5,593,478 A | 1/1997 | Hill et al. | |
| 5,632,804 A | 5/1997 | Schartz | |
| 5,669,960 A | 9/1997 | Couche | |
| 5,753,010 A | 5/1998 | Sircar et al. | |
| 5,807,423 A | 9/1998 | Lemcoff et al. | |
| 5,827,358 A | 10/1998 | Kulish et al. | |
| 5,876,485 A | 3/1999 | Andreani | |
| 5,917,135 A | 6/1999 | Michaels et al. | |
| 6,056,804 A | 5/2000 | Keefer et al. | |
| 6,063,161 A | 5/2000 | Keefer et al. | |
| 6,171,574 B1 * | 1/2001 | Juda et al. | 423/648.1 |
| 6,221,117 B1 * | 4/2001 | Edlund et al. | 48/76 |
| 6,270,556 B1 | 8/2001 | Rouge et al. | |
| 6,273,936 B1 | 8/2001 | Barry et al. | |
| 6,277,174 B1 | 8/2001 | Neu et al. | |
| 6,372,026 B1 | 4/2002 | Takemasa et al. | |
| 6,406,523 B1 | 6/2002 | Connor et al. | |
| 6,432,176 B1 | 8/2002 | Klos et al. | |
| 6,451,095 B1 | 9/2002 | Keefer et al. | |
| 6,471,744 B1 | 10/2002 | Hill | |
| 6,488,747 B1 | 12/2002 | Keefer et al. | |
| 6,497,755 B2 | 12/2002 | Murdoch et al. | |
| 6,533,846 B1 | 3/2003 | Keefer et al. | |
| 6,544,316 B2 | 4/2003 | Baker et al. | |
| 6,619,336 B2 | 9/2003 | Cohen et al. | |
| 6,712,087 B2 | 3/2004 | Hill et al. | |
| RE38,493 E | 4/2004 | Keefer et al. | |
| 6,723,156 B2 | 4/2004 | Edlund et al. | |
| 6,767,389 B2 | 7/2004 | Edlund et al. | |
| 6,770,391 B2 | 8/2004 | Nelson et al. | |
| 6,783,741 B2 * | 8/2004 | Edlund et al. | 422/191 |
| 7,011,693 B2 * | 3/2006 | Mallavarapu et al. | 95/22 |
| 2002/0094310 A1 | 7/2002 | Krause et al. | |
| 2003/0175564 A1 | 9/2003 | Mitlitsky et al. | |
| 2004/0065013 A1 * | 4/2004 | DeVries | 48/198.2 |
| 2004/0107831 A1 | 6/2004 | Graham et al. | |
| 2004/0115504 A1 | 6/2004 | Moeller et al. | |
| 2004/0136883 A1 * | 7/2004 | Buxbaum | 422/177 |

FOREIGN PATENT DOCUMENTS

WO    WO 2006/133576    * 12/2006

* cited by examiner

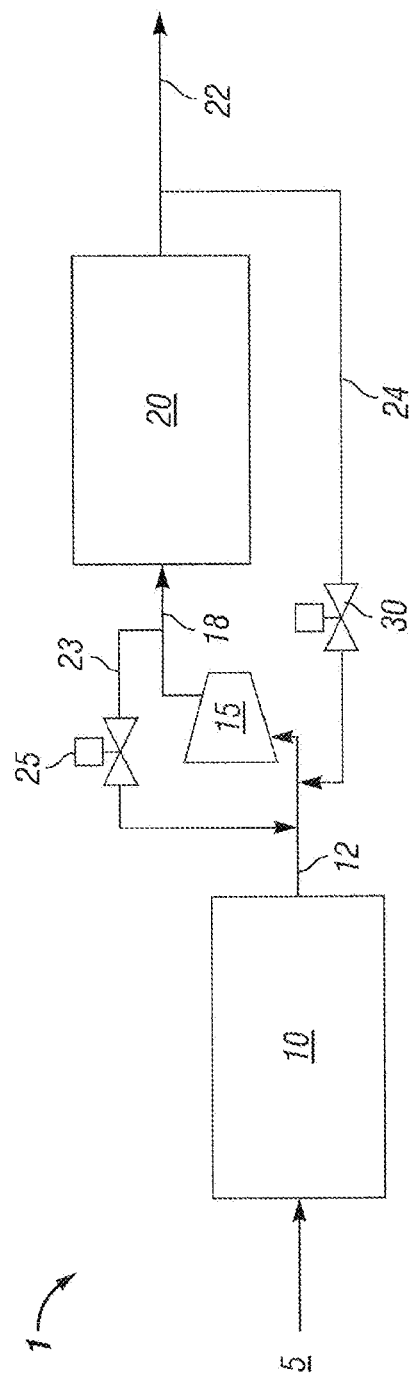
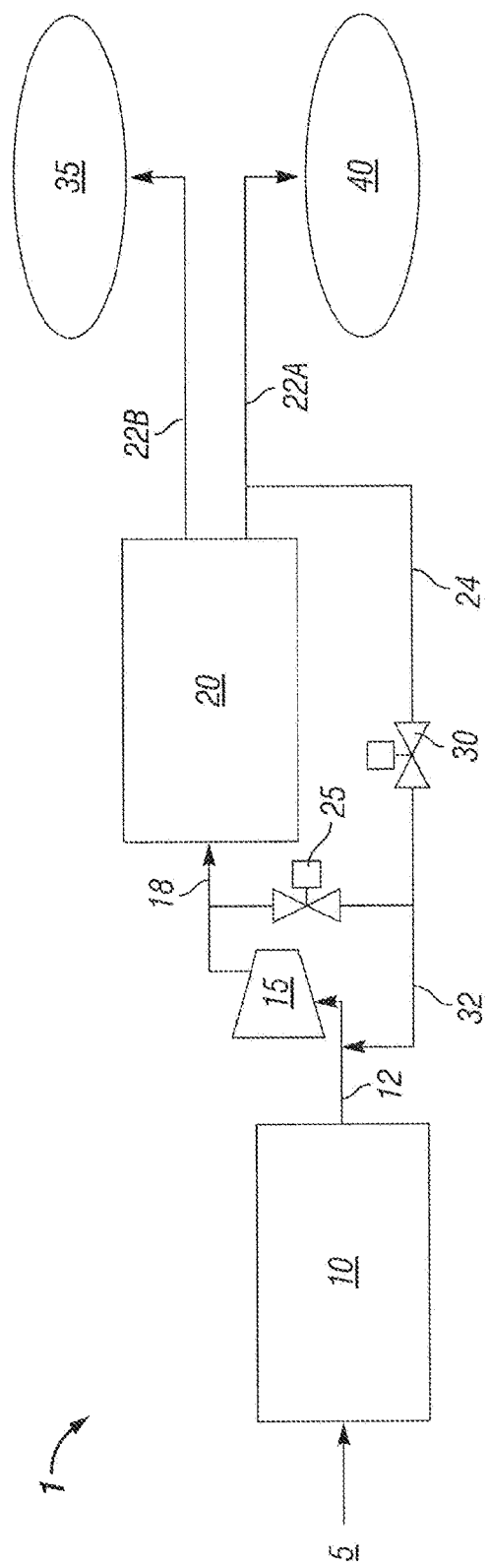
FIG. 1A
FIG. 1B

US 7,763,085 B2

APPARATUS FOR PRODUCING HYDROGEN

The present invention is a divisional application of U.S. Ser. No. 11/015,588, filed Dec. 17, 2004, the complete disclosure of which is incorporated herein by reference.

FIELD OF THE INVENTION

The present invention relates to the field of fuel processing wherein hydrocarbon-based fuels are converted to a hydrogen-enriched reformate for ultimate use in hydrogen-consuming devices and processes. An apparatus and method of the present invention provide a hydrogen-enriched reformate of high purity by removing impurities through various purification technologies such as pressure swing adsorption, membrane separation and the like that require the reformate to be at a relatively high initial pressure. The compression of a hydrogen-rich reformate for storage purposes is also addressed.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluent gas, a fuel component for combustion reactions, a fuel for fuel cells, as well as a reducing agent in numerous chemical reactions and processes. In addition, hydrogen is being considered as an alternative fuel for power generation because it is renewable abundant, efficient, and unlike other alternatives, produces zero emissions. While there is wide-spread consumption of hydrogen and great potential for even more, a disadvantage which inhibits further increases in hydrogen consumption is the absence of an infrastructure that can provide generation, storage and widespread distribution of hydrogen.

One way to overcome this difficulty is through distributed generation of hydrogen, such as through the use of fuel processors to convert hydrocarbon-based fuels to hydrogen-rich reformats. Fuel reforming processes, such as steam reforming, partial oxidation, and autothermal reforming, can be used to convert hydrocarbon-based fuels such as natural gas, LPG, gasoline, and diesel, into hydrogen-rich reformate at a site where hydrogen is needed. However, in addition to the desired hydrogen product, fuel reformers typically produce undesirable impurities that reduce the value of the reformed product. For instance, in a conventional steam reforming process, a hydrocarbon feed, such as methane, natural gas, propane, gasoline, naphtha, or diesel, is vaporized, mixed with steam, and passed over a steam reforming catalyst. The majority of the hydrocarbon feed is converted to a reformate mixture of hydrogen and impurities such as carbon monoxide and carbon dioxide. To reduce the carbon monoxide content, the reformate is typically subjected to a water-gas shift reaction wherein the carbon monoxide is reacted with steam to form carbon dioxide and hydrogen. After the shift reaction(s), additional purification steps may be utilized to bring the hydrogen purity to acceptable levels. These purification steps can include, but are not limited to, methanation, selective oxidation reactions, membrane separation techniques, and selective adsorption such as in temperature swing and/or pressure swing adsorption processes.

Although purification technologies can effectively provide a purified hydrogen product, many require compression of the reformate to an initial high pressure. Similarly, many forms of hydrogen storage such as the use of hydrogen-fixing materials and high pressure tanks require a high pressure hydrogen feed as well. To achieve efficient compression and to avoid adverse effects due to fluctuations in pressure and/or flow rate, a subject reformate should have a relatively stable pressure and/or flow rate at the inlet of the compression unit. Such consistency can be particularly difficult to achieve where the hydrogen is a reformate derived from a fuel processor. Adverse consequences due to fluctuations in reformate pressure and/or flow rate can include an upset within the fuel processor from which the hydrogen reformate is derived and the formation of a vacuum at the inlet to a compression unit creating the potential for drawing atmospheric gases into the process stream. Moreover, where the compressed reformate is to be purified in a purification unit such as a pressure swing adsorption unit, such fluctuations can negatively impact the purity of the hydrogen-enriched reformate produced.

SUMMARY OF THE INVENTION

In one aspect of the present invention, an apparatus for producing hydrogen is provided. The apparatus includes a fuel processor for converting a fuel to a reformate comprising hydrogen and an impurity, the reformate having fluctuations in pressure and/or flow rate. Means for reducing the fluctuations in pressure and/or flow rate are disposed downstream of the fuel processor. A compression unit is also disposed downstream of the fuel processor for receiving the reformate and producing a compressed reformate. A purification unit is disposed downstream of the compression unit for receiving at least a portion of the compressed reformate and producing a hydrogen-enriched reformate. The means for reducing fluctuations in the pressure and/or flow rate of the reformate can include one or more of a buffer disposed intermediate of the fuel processor and the compression unit, and a conduit capable of providing a controlled flow of a supplemental fluid to an inlet of the compression unit. The supplemental fluid can include one or more of a compressed reformate and a hydrogen-enriched reformate. Optionally, the apparatus can include means for regulating power to the compression unit.

In another aspect of the present invention, an apparatus for producing hydrogen is provided. The apparatus includes a fuel processor for converting a fuel to a reformate comprising hydrogen and an impurity, the reformate having fluctuations in pressure and/or flow rate. Means for reducing the fluctuations in pressure and/or flow rate are disposed do-stream of the fuel processor. A compression unit is also disposed downstream of the fuel processor for receiving the reformate and producing a compressed reformate. A storage unit is disposed downstream of the compression unit that is capable of receiving at least a portion of the compressed reformate and storing the compressed reformate. The means for reducing fluctuations in pressure and/or flow rate can include one or more of a buffer disposed intermediate of the fuel processor and the compression unit, and a conduit that is capable of providing a controlled flow of a supplemental fluid to an inlet of the compression unit. The supplemental fluid can include one or more of a compressed reformate and hydrogen-enriched reformate. Optionally, the apparatus can include means for regulating power to the compression unit.

In a process aspect of the present invention, a method for producing hydrogen is provided. The method includes the steps of producing a reformate comprising hydrogen and an impurity in a fuel processor, the reformate having fluctuations in pressure and/or flow rate. The fluctuations in pressure and/or flow rate are reduced and the reformate is compressed in a compression unit to produce a compressed reformate. Impurity is removed from the compressed reformate in a purification unit to produce a hydrogen-enriched reformate.

Fluctuations in the pressure and/or flow rate of the reformate produced by the fuel processor can be reduced by one or more of buffering the reformate prior to compressing it, and providing a controlled flow of a supplemental fluid to an inlet of the compression unit. The supplemental fluid can include one or more of a compressed reformate and a hydrogen-enriched reformate. Optionally, the method can include adjusting power to the compression unit during start up, shut-down and other significant transients. Optionally, the method can include the steps of compressing the hydrogen-enriched reformate in a second compression unit to produce a compressed hydrogen-enriched reformate, storing at least a portion of the compressed hydrogen-enriched reformate in a storage unit, and providing a controlled flow of the compressed hydrogen-enriched reformate to an inlet of the second compression unit.

In another process aspect of the present invention, a method for producing hydrogen is provided. The method includes the steps of producing a reformate comprising hydrogen and an impurity in a fuel processor that has fluctuations in pressure and/or flow rate. The fluctuations in pressure and/or flow rate are reduced and the reformate is compressed in a compression unit to produce a compressed reformate. The compressed reformate is stored in a storage unit. The fluctuations in pressure and/or flow rate can be reduced by one or more of buffering the reformate prior to compressing it, and providing a controlled flow of compressed reformate to an inlet of the compression unit. Optionally, the method can include adjusting power to the compression unit during start up, shut-down and other significant transients.

BRIEF DESCRIPTION OF THE DRAWINGS

The invention may be understood by reference to the following description taken in conjunction with the accompanying drawings.

FIG. 1A is a schematic illustration of an embodiment of the present invention having a fuel processor and a pressure swing adsorption unit.

FIG. 1B is a schematic illustration of an embodiment of the present invention having a fuel processor and a pressure swing adsorption unit.

Figure 2:
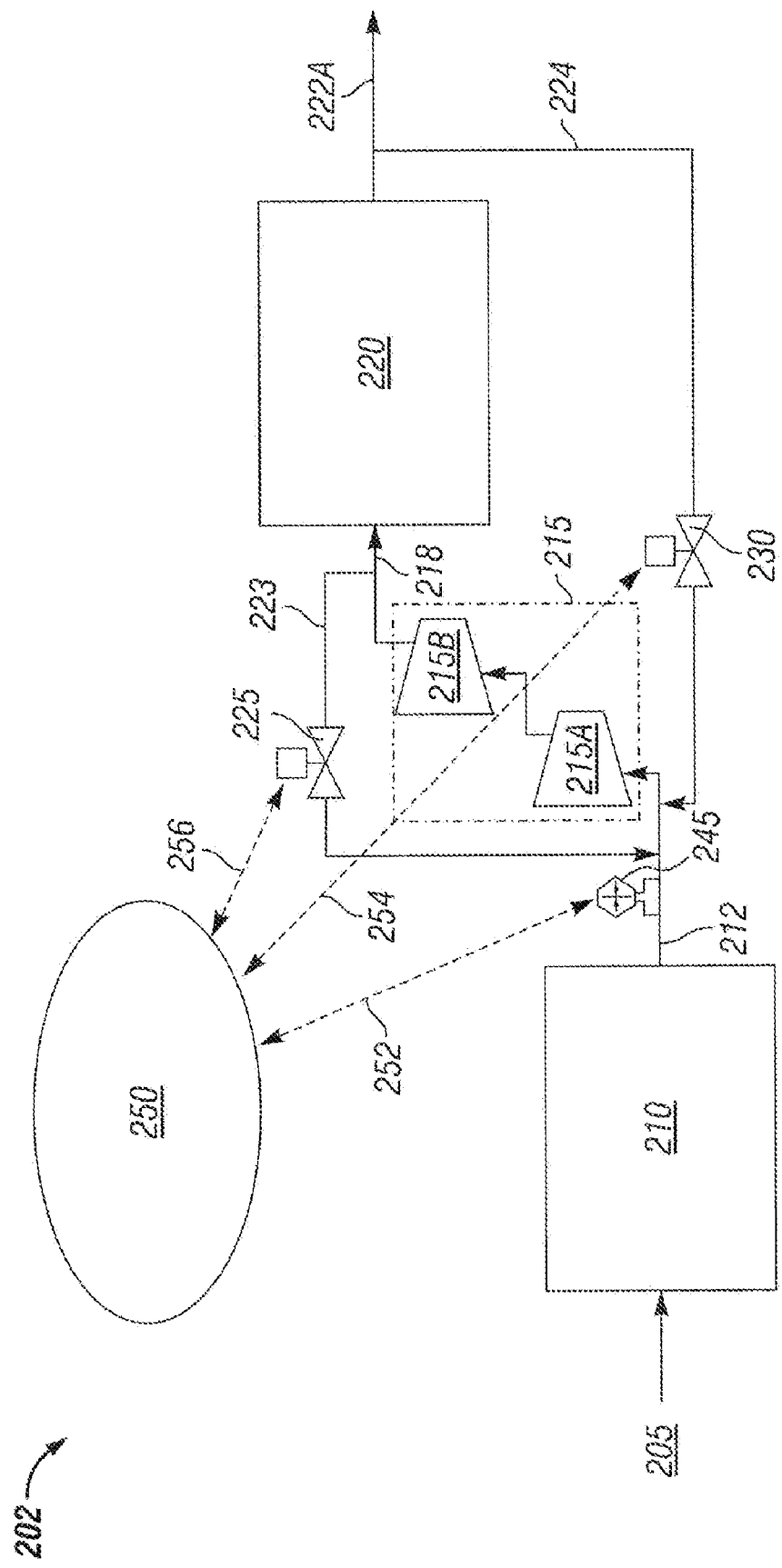
FIG. 2 is a schematic illustration of an embodiment of the present invention having a fuel processor and a pressure swing adsorption unit.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

An apparatus of the present invention includes a fuel processor for converting a fuel to a reformate comprising hydrogen and an impurity. The flow of reformate can have fluctuations in pressure and/or flow rate and means are provided for reducing the fluctuations. The means for reducing the fluctuations in pressure and/or flow rate can include one or more of a buffer disposed intermediate of the fuel processor and the compression unit and a conduit capable of providing a controlled flow of a supplemental fluid to an inlet of the compression unit. The supplemental fluid can include a compressed reformate, a hydrogen-enriched reformate or mixtures thereof. The apparatus includes a compression unit disposed downstream of the fuel processor for receiving the reformate and producing a compressed reformate. One or more of a purification unit for producing a hydrogen-enriched reformate and a storage unit for storing the compressed reformate are disposed downstream of the compression unlit for receiving the compressed reformate. The provision of a buffer and/or a controlled flow of supplemental fluid to the inlet of the compression unit ensures that the reformate stream that is delivered to the compression unit inlet has a more uniform or stable pressure and flow rate. Further, the influx of supplemental fluid serves to inhibit the formation of a vacuum upstream of the compression unit that might otherwise cause atmospheric gases to be drawn into the reformate stream.

An apparatus of the present invention comprises a fuel processor. A fuel processor suitable for use in an apparatus of the present invention includes a device or apparatus that is capable of producing a reformate comprising hydrogen and one or more impurities. The ultimate objective of an apparatus of the present invention is to produce a substantially pure hydrogen product that can be used safely and reliably in any hydrogen-consuming device or process. As such, an "impurity" in this context includes any material that has the potential to foul, damage or otherwise interfere with the operation of hydrogen-consuming device or process or a hydrogen-storage device. Such impurities typically include sulfur-containing compounds, nitrogen-containing compounds, carbon oxides, liquid water, steam, unreacted hydrocarbons, and inert gases.

Figure 5:
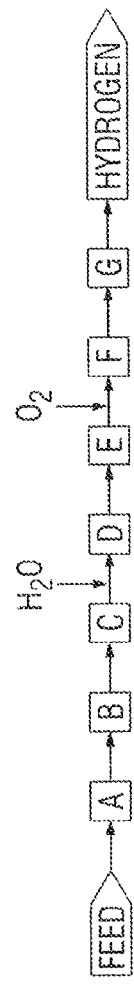
FIG. 5 is a block diagram illustrating a process flow within a fuel processor for producing a reformate.

In some embodiments, the fuel processor can include an oxidizer and reformer for converting a fuel to a reformate that comprises hydrogen and one or more impurities. Reformers are well known in the fuel processing art and can be designed to perform one or more of steam reforming, partial oxidation, and autothermal reforming reactions among others. Although suitable fuel processors can utilize any known reformer, the following illustrative description associated with FIG. 5 is adapted from U.S. patent application Ser. No. 10/006,963, entitled "Compact Fuel Processor for Producing a Hydrogen Rich Gas," filed Dec. 5, 2001, in the name of Krause, et al., and published Jul. 18, 2002 (Publication No US2002/009410 A1), which describes a fuel processor for performing a combination of steam reforming and autothermal reforming.

As illustrated in FIG. 5, the feed to the fuel processor can include a hydrocarbon-based fuel, oxygen, water, and mixtures of the same. Hydrocarbon-based fuels suitable for use in the processor can include natural gas, LPG, gasoline, diesel, alcohols, and mixtures thereof. Natural gas is a preferred hydrocarbon-based fuel. Oxygen can be in the form of air, oxygen-enriched air, or substantially pure oxygen. Fuel(s) and water can be introduced as liquid and/or vapor. However, depending on the initial phase of the feed materials and the nature of the reforming reaction(s) some degree of feed preparation may be required. For instance, it is preferred that both liquid water and fuel(s) be converted to a gas phase, and further that reactants be pre-heated prior to their introduction into a reaction zone within the reformer. A metering device can be used to provide automated control over the flow of each of the feeds to the fuel processor and sensors can be used to provide feedback concerning the composition, pressure and/or flow rate of those feeds.

Block A of FIG. 5 represents a reforming step, in which, in one particular embodiment, two reactions, a partial oxidation (formula I, below) and a steam reforming (formula II, below), are performed to convert the feed into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

A higher concentration of oxygen in the feed stream favors the exothermic partial oxidation whereas a higher concentration of water vapor favors the endothermic steam reforming reaction. Therefore, the ratios of oxygen to hydrocarbon and water to hydrocarbon as well as the reaction temperature are characterizing parameters that affect hydrogen yield. The reaction temperature of reforming step A can range from about 550° C. to about 900° C., depending on the feed conditions and the catalyst Examples of partial oxidation and steam reforming catalysts are well known in the fuel reforming art and are not described in detail.

Block B represents a cooling step wherein the synthesis gas stream from reforming step A is cooled to a temperature of from about 200° C. to about 600° C., and preferably from about 375° C. to about 425° C., to prepare the synthesis gas for process step C (discussed below). This cooling may be achieved with heat sinks, heat pipes, heat exchangers or the like depending upon the design specifications and the extent to which heat is to be recovered/recycled from the synthesis gas. Cooling of the synthesis gas can also be achieved by other means known in the art, e.g., injection of a lower temperature steam into the synthesis gas stream.

Block C represents a desulphurization step. An impurity of many fuels is sulfur, which is commonly converted to hydrogen sulfide during reforming step A. Desulfurization preferably utilizes zinc oxide and/or other material(s) capable of absorbing and converting the hydrogen sulfide, with or without a support (e.g., monolith, extrudate, pellet, etc.). Desulphurization can be accomplished by converting the hydrogen sulfide to zinc sulfide in accordance with the following reaction formula III:

$$H_2S + ZnO \rightarrow H_2O + ZnS \qquad (III)$$

Desulfurization is preferably carried out at a temperature of from about 300° C. to about 500° C. and more preferably from about 375° C. to about 425° C.

The desulfurized process stream may then be sent to a mixing step D wherein water received from a water subsystem is optionally added. The addition of water serves the dual purposes of lowering the temperature of the process stream and of supplying additional water for use in the water gas shift reaction to follow. The water vapor and other stream components are mixed by being passed through a stage of inert materials such as ceramic beads or other similar materials that effectively mix and/or assist in the vaporization of water. Alternatively, additional water can be introduced prior to reforming step A and the mixing step can be repositioned or eliminated. Where the process stream is to be subjected to a selective oxidation, a mixing step may also be utilized to mix an oxidant with the process stream prior to oxidation.

Block E represents a water gas shift reaction step that converts carbon monoxide to carbon dioxide in accordance with formula IV:

$$H_2O + CO \rightarrow H_2 + CO_2 \qquad (IV)$$

Generally, the water gas shift reaction can take place at temperatures ranging from 150° C. to 600° C. depending on the catalyst. Under such conditions, much of the carbon monoxide in the gas stream is converted to carbon dioxide. Where the hydrogen-enriched reformate is to be used as a fuel for fuel cells, the concentration of carbon monoxide needs to be lowered to a level that call be tolerated by fuel cell catalyst(s), typically below about 50 ppm. Examples of water gas shift catalysts, both low and high temperature catalysts, are well known in the fuel reforming art and are not set forth in detail herein.

Block F represents a cooling step that can be performed in an inert stage or otherwise to reduce the temperature of the process stream to a temperature preferably in the range of from about 90° C. to about 150° C. When the cooling step F is to be followed by a selective or preferential oxidation step, oxygen from an air subsystem can also be added to the process stream.

Block G represents an optional selective or preferential oxidation step wherein much of the remaining carbon monoxide in the process stream is converted to carbon dioxide. Although this oxidation is carried out ill the presence of a catalyst having activity for oxidizing carbon monoxide, two reactions typically occur, namely, a desirable oxidation of carbon monoxide (formula V) and an undesirable oxidation of hydrogen (formula VI).

$$CO + \tfrac{1}{2}O_2 \rightarrow CO_2 \qquad (V)$$

$$H_2 + \tfrac{1}{2}O_2 \rightarrow H_2O \qquad (VI)$$

Since both reactions produce heat and because the preferred oxidation of carbon monoxide is favored by low temperatures, it may be advantageous to optionally include a cooling element such as a cooling coil within an oxidation reaction zone. The oxidation reaction temperature is preferably kept in the range of from about 90° C. to about 150° C. Where the apparatus comprises a purification unit such as a pressure swing adsorption or membrane separator downstream from the fuel processor, selective oxidation reaction step G can be omitted.

As noted herein, the reformate produced by the fuel processor is rich in hydrogen but can contain one or more impurities including carbon dioxide, water, inert components such as nitrogen and argon, and residual hydrocarbons among others. In many embodiments, the apparatus will include a purification unit to remove or reduce such impurities to extremely low levels. However, the reformate is typically at a low pressure, on the order of less than about 50 psig, preferably less than about 25 psig, more preferably less than about 10 psig and still more preferably less than about 5 psig. Depending on the nature of the purification technique to be used, the pressure of the reformate may need to be increased prior to delivery to the purification unit. Moreover, compression of the reformate may be required for purposes of storing the reformate or for some end use of the reformate. Therefore, an apparatus of the present invention will include a compression unit downstream of the fuel processor for receiving a flow of reformate and producing a flow of compressed reformate. In some embodiments, such as where the hydrogen-enriched reformate exiting a purification unit is destined for a storage at elevated pressure, a second compression unit can optionally be disposed intermediate the purification unit and a storage unit for increasing the pressure of the hydrogen-enriched reformate to an appropriate level.

Compression units are known in the art for compressing mixtures of gases containing hydrogen prior to subjecting, the mixtures to separation techniques and/or storage. A more detailed description of such compression technologies can be found in chemical engineering references such as Perry's Chemical Engineers' Handbook, $4^{th}$ Ed. (McGraw-Hill, © 1963), and in the patent literature such as in U.S. Pat. No. 4,690,695 issued Sep. 1, 1987 to Doshi; U.S. Pat. No. 6,488,747 issued Dec. 3, 2002 to Keefer et al.; and U.S. Application Publication No. US 2003/0175564 A1 published Sep. 18, 2003 by Mitlitsky et al., the descriptions of which are incorporated by reference. While the compression unit need not be described in exacting detail, it should be recognized that a suitable compression unit can comprise a compressor driven by a fixed or variable speed motor in a single stage or two or more compressors in a multi-stage compression unit. Further, suitable compression units can include axial, centrifugal, reciprocating, rotary-type compressors and combinations of the same. In an embodiment where a compressor is also provided upstream from the cathode of a fuel cell for supplying an oxidant to the cathode inlet, such a compressor preferably comprises a non-centrifugal-type compressor.

The pressures that the compression unit should be capable of imposing on a fluid will depend on the purpose for which compression is needed. Where the compression unit is disposed upstream of a purification unit, the pressure requirements of the purification unit (e.g., a pressure swing adsorption unit, membrane separator, etc.) will govern. In the case of purification units comprising a pressure swing adsorption unit ("PSA"), the pressure of the reformate feed to the PSA should be between about 1 psig and about 600 psig. In an embodiment where the reformate is directed to a membrane separator, higher pressures such as between about 600 psig and about 300 psig may be required. Similarly, the pressure requirements for storage units call vary significantly. For instance, storage units that comprise hydrogen fixing materials can require a wide variety of pressures ranging from just above zero to several thousand pounds per square inch depending on the type of hydrogen-fixing material used. Likewise, storage in high pressure tanks can require a reformate feed at pressures between about 1000 psig, and about 10,000 psig. Further, depending on the requirements of the purification and/or storage unit, the compression capacity of a selected compression unit could fall outside these ranges.

In an embodiment wherein the purification unit comprises a pressure swing adsorption unit, the speed of a compressor(s) is preferably set independent from the flow rate of reformate to the PSA and the length of the adsorption period during which impurities are adsorbed from a flow of reformate through the PSA. More specifically, where the purification unit comprises a rotary-type PSA having a rotary distribution valve for controlling the material flows to a plurality of adsorbent beds, the speed of a compressor(s) is preferably set independent from the speed of the rotary distribution valve. In such embodiments, the compression unit preferably comprises a fixed speed compressor.

In embodiments where the compression unit comprises a compressor driven by a fixed speed motor or an induction motor, care should be taken during start-up when the compressor is first energized to ensure that sufficient fluid is present at the inlet of the compressor to prevent the formation of a vacuum. Similar care should also be exercised during shut-down and during transients of the fuel processor such as prior to resuming hydrogen production from stand-by status. As an alternative to assuring the presence of sufficient fluid, the speed of the compressor motor can be regulated by adjusting the power applied to the compression unit and the compressor motor. Suitable means for regulating the power can include a variable frequency drive for adjusting the line frequency applied to the motor, a soft start device for varying the voltage applied to the motor, and other means known in the art for regulating the power applied to the motor. One skilled in the art will appreciate that the selection of a suitable compression unit will be based on such factors as the composition of the reformate its flow rate, pressure and temperature the pressure requirements of the downstream unit(s), as well as factors such as the compression unit's power consumption, serviceability and cost.

As noted herein, the reformate produced by a fuel processor can have fluctuations or variations in pressure and/or flow rate. Thus, an apparatus of the present invention includes means for reducing or eliminating such fluctuations before they reach a downstream purification and/or storage unit. As used herein, "reducing fluctuations in pressure and/or flow rate" is intended to refer to reductions in either the size or number of fluctuations in the pressure and/or flow rate of the reformate. Moreover, such means can also be employed to prevent the formation of a vacuum within a line carrying reformate to a compression unit.

Means for reducing fluctuations in pressure and/or flow rate can comprise a buffer disposed intermediate the fuel processor and the compression unit. Although such a buffer could be disposed at any location intermediate the fuel processor and a downstream purification or storage unit, it is preferably disposed upstream from a compression unit so that a more uniform flow of reformate is provided to an inlet of the compression unit. Those skilled in the art will appreciate that such a buffer will have sufficient volume to receive a variable flow of reformate from the fuel processor while releasing a more uniform flow to the purification unit. Moreover, in an embodiment where the buffer is disposed upstream from the compression unit, the flow of reformate from the buffer should be sufficient to prevent a vacuum from forming at the compression unit inlet during both start-up and steady state operations.

In some embodiments, means for reducing fluctuations in the pressure and/or flow rate can comprise a conduit for providing a controlled flow of a supplemental fluid to an inlet of a compression unit. The supplemental fluid can include a compressed flow of reformate derived from an outlet of the compression unit, a hydrogen-enriched reformate derived from a purification unit, or some mixture thereof. The conduit has an outlet that directs the supplemental fluid into a line carrying reformate from the fuel processor to the compression unit.

The number and location of conduit inlets are determined by the composition of the supplemental fluid. Where the supplemental fluid includes a compressed reformate, the conduit has an inlet downstream of the compression unit. Where the supplemental fluid includes a hydrogen-enriched reformate, the conduit has an inlet downstream from a purification unit. In such an embodiment, the purification unit can optionally include a first outlet for directing a hydrogen-enriched reformate and a second outlet for directing a hydrogen-depleted product out of the purification unit with the inlet of the conduit in fluid communication with the first outlet of the purification unit. In addition, the conduit can have two or more inlets depending on the composition of the supplemental fluid. Specifically, where the fuel processing apparatus has a purification unit disposed downstream of the compression unit, the conduit can have an inlet intermediate the compression and purification units for directing compressed reformate into the conduit, and a second inlet downstream of the purification unit for directing a hydrogen-enriched reformate into the conduit.

In some embodiments, the conduit can have a variable-opening valve for controlling the flow of supplemental fluid therethrough. Where the apparatus includes an optional sensor for sensing the fluid flowing from the fuel processor, e.g., reformate, supplemental fluid(s) etc., the variable-opening valve can be operated in response to sensed data generated by the sensor. More specifically, a sensor can be disposed upstream from but proximate to an inlet of a compression unit for acquiring data about the fluid(s) entering the compression unit. Preferably, the sensor will comprise a sensor for sensing the pressure and/or flow rate of the reformate at the inlet of the compression unit. In some embodiments, the sensor will be in communication with a controller so that sensed data can be relayed to the controller. In such an apparatus, the controller is capable of receiving the sensed data and operating the valve in response to the sensed data. By way of illustration, when the controller determines that the pressure and/or flow rate of reformate entering the inlet of the compression unit is below a predetermined level, a signal or instruction is sent to the valve actuator to open the valve and increase the flow of the supplemental fluid to the inlet of the compression unit. Conversely, where the pressure and/or flow rate of the reformate at the inlet of the compression unit is sensed to be at or above the predetermined level, the controller can instruct the valve actuator to constrict or close the valve. In this context, the predetermined level used by the system controller to control the operation of the valve is a pressure and/or flow rate of the reformate that will prevent the formation of a vacuum in the line feeding the compression unit.

An apparatus of the present invention can include a purification unit disposed downstream of the compression unit for receiving at least a portion of the compressed reformate and producing a hydrogen-enriched reformate. Technologies for removing impurities from and/or concentrating hydrogen within a reformate gas stream are well known in the art and can include, methanation, selective oxidation, membrane separation techniques, temperature swing adsorption and pressure swing adsorption processes.

By way of example, a number of purification processes separate hydrogen from impurities through selective adsorption by passing the hydrogen-containing stream under pressure through a column or bed of adsorbent materials. An adsorbent bed can include adsorbent materials and a vessel for housing the adsorbent material(s). The adsorbent materials can take a variety of forms including packed beds of agglomerates, pellets, particles, and/or beads, monolithic structures, as well as various supports coated with adsorbent materials, e.g., coated sheets. In some embodiments, the adsorbent materials are provided as a packed bed having multiple layers of different adsorbent materials and/or mixtures of different adsorbent materials. In other embodiments, the adsorbent bed can comprise a coated monolith or other structure configured to provide fluid pathways through the bed. Adsorbent materials suitable for use in a purification unit will depend on the materials to be adsorbed and removed from the process stream. By way of example, adsorbent materials known for use in removing water vapor, carbon dioxide and hydrocarbons can include alumina gels, activated carbon, silica gels and zeolites Moreover, zeolites such as low silica X zeolite and calcium or strontium exchanged chabazite are known for removing carbon monoxide and nitrogen.

It is highly preferred that the adsorbent materials be capable of regeneration through techniques such as pressure swing, temperature swing and the like. As a result, the purification unit should be capable of cycling the adsorption bed through an adsorption period and then through regeneration. A plurality of adsorption beds is used so that at the conclusion of an adsorption period for a first bed, the flow of compressed reformate can be interrupted and re-directed to a second adsorbent bed to continue the production of hydrogen-enriched reformate while enabling the first adsorbent bed to be regenerated. Moreover, it is envisioned that two or more adsorption beds will be operated in an adsorption period or phase while other adsorption beds are undergoing various stages of regeneration. Suitable purification units will preferably include those that are capable of adjusting and manipulating the adsorption period so as to compensate for fluctuations in the composition, pressure and/or flow rate of the reformate. The manner in which the adsorption period can be adjusted for purposes of achieving a hydrogen-enriched reformate depends on the type and structure of the purification unit selected.

In some embodiments, the purification unit will comprise a pressure swing adsorption unit. Suitable PSAs include those known in the art such as are described in U.S. Pat. No. 4,238,204 issued Dec. 9, 1980 to Perry; U.S. Pat. No. 4,690,695 issued Sep. 1, 1987 to Doshi; U.S. Pat. No. 5,435,836 issued Jul. 25, 1995 to Anand et al.; U.S. Pat. No. 5,669,960 issued Sep. 23, 1997 to Couche; U.S. Pat. No. 5,753,010 issued May 19, 1998 to Sircar et al.; and U.S. Patent Application Publication No. US 2004/1007831 A1 published Jun. 10, 2004 by Ciraham et al., the descriptions of which are incorporated herein by reference. In some embodiments, the purification unit will comprise a compact PSA. Suitable compact PSAs can include a rotary-type PSA such as are described in U.S. Pat. No. 6,406 523 issued Jun. 18, 2002 to Connor et al., the description of which is incorporated herein by reference. Compact PSAs having rotary elements are commercially available from Questair Technologies, Inc. of Burnaby, Canada. Questair's rotary-type PSA, model series number H3200, were used in the development of the present invention.

The PSA unit optionally but preferably includes a valve assembly that is capable of selectively controlling the flow of the reformate to one or more of the plurality of adsorbent beds. The valve assembly can comprise single or multiple valves having fixed or variable openings that are opened and closed to control material flows to the adsorbent beds. The valve assembly is capable of providing control over the flow of reformate to the adsorbent beds by selectively controlling which adsorbent bed(s) receive a flow of reformate and by controlling the sequence in which different materials are directed through an adsorbent bed. As such, the configuration of the valve assembly provides control over both the adsorption period and regeneration phases of each adsorbent bed. Depending on the nature of the adsorbent materials within the beds, regeneration can comprise imposing pressure and/or temperature swings, directing various materials through the bed and the like.

In an embodiment where the purification unit comprises a rotary-type PSA, rotation is created between the valve assembly and the plurality of adsorbent beds or inlets to the adsorbent beds so as to cycle each of the plurality of beds through adsorption-regeneration cycles. Rotation between the valve assembly and the adsorbent beds is preferably created by a variable-speed motor. Whereas the valve assembly controls the sequence of operations for each phase of the plurality of beds, the variable speed motor controls the length of each of those operations and the frequency at which the operations change. By adjusting the speed of such a motor, the adsorption period for each of the plurality of beds can be increased or decreased. Moreover, such changes in speed alter the frequency at which the flow of reformate is switched from a first adsorbent bed to a second adsorbent bed.

In other embodiments, the purification unit can comprise a membrane separator for separating one or more components from a mixture of gases under pressure. Preferably, a membrane separator will comprise a hydrogen-selective membrane. Descriptions of suitable membrane separators, their components and materials may be obtained by reference to U.S. Pat. No. 4,690,695 issued Sep. 1, 1987 to Doshi; U.S. Pat. No. 5,435,836 issued Jul. 25, 1995 to Anand et al., U.S. Pat. No. 6,544,316 B2 issued Apr. 8, 2003 to Baker et al.; U.S. Pat. No. 6,723,156 issued Apr. 20, 2004 to Edlund et al.; U.S. Patent Application Publication No. US 2004/0115504 A1 published Jun. 17, 2004 by Moeller et al.; and U.S. Pat. No. 6,767,389 issued Jul. 27, 2004 to Edlund et al., the descriptions of which are incorporated herein by reference.

An apparatus of the present invention can optionally include a product valve disposed downstream of the purification unit for use in controlling a flow of hydrogen-enriched reformate from the purification unit. In some embodiments, the product valve comprises a variable-opening valve. Where an optional product sensor is present downstream from the purification unit for sensing the hydrogen-enriched reformats, the product valve can be operated in part in response to sensed product data generated by the product sensor. Preferably, the product sensor is disposed downstream and proximate to an outlet of the purification unit so that changes in the hydrogen-enriched reformate are detected quickly and compensating action can be taken to maintain the composition of the hydrogen-enriched reformate. Where an optional tank is disposed downstream of the purification unit for receiving and storing a hydrogen-enriched reformate, the product sensor is disposed upstream from the tank so that off-specification reformate can be detected and diverted before it is received by the tank. Control over the flow of hydrogen-enriched reformate out of the purification unit can be used to create back-pressure within the purification unit to maintain a more stable or fixed pressure within the purification unit. Moreover, such control can also provide additional control over the flow rate of reformate through the purification unit for purposes of maintaining the composition of the hydrogen-enriched reformate.

The sensed product data generated by an optional product sensor can comprise one or more of temperature, pressure, density, flow rate and compositional data. The product sensor preferably comprises a gas sensor. The type of sensor selected is determined by the nature of the data that needed. In some embodiments, the product sensor can comprise a compositional-type sensor for determining the concentration of a component within the hydrogen-enriched reformate and/or the hydrogen-depleted reformate. For instance, sensors for detecting the presence or concentration of carbon monoxide, carbon dioxide, hydrocarbons, water, sulfur-containing compounds, and nitrogen-containing compounds are commercially available. In an embodiment where the product sensor comprises a sensor for sensing compositional data, the sensor is preferably not suitable for sensing the concentration of free oxygen in the hydrogen-enriched reformate and/or the hydrogen-depleted reformate. In other embodiments, the product sensor comprises a pressure sensor or flow meter for monitoring the pressure and/or flow rate of the hydrogen-enriched reformate exiting the purification unit.

In an embodiment where data relating to the concentration of hydrogen in the hydrogen-enriched reformate is needed, the sensor can comprise a sensor capable of directly sensing the hydrogen concentration, or one or more sensors capable of sensing data from which the hydrogen concentration may be determined. A description of a method and apparatus for indirectly determining the hydrogen concentration of a reformate fed to a fuel cell can be found in U.S. Pat. No. 6,770,391 B2 issued Aug. 3, 2004 to Nelson et al. The concentration of hydrogen in the hydrogen-enriched reformate exiting the purification unit should be greater than about 99.96%, preferably greater than about 99.97%, and more preferably greater than about 99.98% by volume. When the sensed product data relayed to the controller indicates that the concentration of hydrogen is decreasing, the purification unit can increase the frequency at which the flow of reformate is directed from one adsorbent bed to the next. More specifically, where the purification unit is a rotary type PSA unit having a variable-speed motor, the speed of the variable-speed motor can be increased to shorten the adsorption period. Similarly, where the sensed product data indicates that the pressure and/or flow-rate of the hydrogen-enriched reformate is increasing, the speed of the variable-speed motor can be increased to shorten the adsorption period and maintain a desired concentration of hydrogen in the hydrogen-enriched reformate.

An apparatus of the present invention can include a storage unit for storing a compressed reformate and/or a compressed hydrogen-enriched reformate. In one embodiment, the storage unit can be disposed downstream of the compression unit for receiving and storing at least a portion of the compressed reformate from the compression unit. In other embodiments, the storage unit can be disposed downstream of a purification unit for storing a hydrogen-enriched reformate. In such an apparatus, a second compression unit can be included that is disposed intermediate the purification unit and the storage unit for producing a compressed hydrogen-enriched reformate for storage in the storage unit. Moreover, where a second compression unit is used, a second conduit can be included that is capable of providing a controlled flow of compressed hydrogen-enriched reformate to an inlet of the second compression unit. The second conduit preferably has an inlet disposed intermediate the second compression unit and the storage unit, a valve for controlling the flow of compressed hydrogen-enriched reformats through the conduit, and an outlet disposed intermediate an outlet of the purification unit and the inlet to the second compression unit.

Storage units suitable for use in an apparatus of the present invention can be selected from hydrogen storage devices that are known in the art. Preferably, the hydrogen storage device will comprise a storage vessel suitable for containing the reformate in a desired form, including but not limited to, pressurized gas, liquefied gas or solid. Suitable storage vessels can be portable, modular, skid mounted or fixed in place. Further, a selected storage unit preferably has sufficient storage capacity to enable the unit to deliver stored reformate to an outlet at a selected rate during periods in which the fuel processor is not operating and/or during periods of peak demand when the volume of reformate produced by the fuel processor must be supplemented to meet demand.

The hydrogen storage unit may comprise a high pressure vessel operably connected in fluid communication with a compression unit for storing a compressed product. Suitable storage units can also utilize hydrogen-fixing material(s) that can reversibly fix hydrogen. Hydrogen-fixing materials are known in the hydrogen storage art and can include activated carbon, carbon composites, fullerene-based materials, metal hydrides, alloys of titanium, vanadium, chromium and manganese, with or without additional elements, magnetic hydrogen-absorbing material, and nanostructures formed from light elements selected from the second and third rows of the periodic table. Examples of vessels containing hydrogen-fixing material for storing compressed hydrogen are described in U.S. Pat. No. 4,598,836 issued Jul. 8, 1986 to Wessel and U.S. Pat. No. 6,432,176 B1 issued Aug. 13, 2002 to Klos et al., the disclosures of which are incorporated herein by reference. In still other embodiments, the storage unit can comprise a liquefaction unit capable of converting the hydrogen-rich product to a liquefied product through cryogenic cooling or other liquefaction techniques.

Optionally, an apparatus of the present invention can include one or more sensors disposed throughout the apparatus for sensing temperature, composition, density, pressure and/or flow rate of fluids at various locations within the apparatus. Further, those skilled in the art will appreciate that sensed data such as temperature and pressure can be used to calculate other fluid conditions such as density. In addition, sensed compositional information can be used for a variety of purposes including estimating the hydrogen concentration of the reformate as is described in U.S. Pat. No. 6,770,391 B2 issued Aug. 3, 2004 to Nelson et al. Sensors for sensing and monitoring the apparatus and fluid conditions of temperature, composition, density, moisture content, pressure and flow rate are known in the chemical processing arts.

As noted above, an apparatus of the present invention can optionally include a controller for monitoring and controlling the operation of one or more of the components of the apparatus. In some embodiments, the controller is implemented on a single computing system for controlling each facet of the operation of the apparatus that is not under manual control. In other embodiments, the controller can comprise multiple computing systems, each for controlling some designated facet of the operation of the apparatus. The controller can be rack-mounted, but could also be implemented as a desktop personal computer, a workstation, a notebook or laptop computer, an embedded processor, or the like. Indeed, this aspect of any given implementation is not material to the practice of the invention.

The computing system preferably includes a processor communicating with memory storage over a bus system. The memory storage can include a hard disk and/or random access memory ("RAM") and/or removable storage such as a floppy magnetic disk and/or an optical disk. The memory storage is encoded with a data structure for storing acquired data, an operating system, user interface software, and an application. The user interface software, in conjunction with a display, implements a user interface. The user interface can include peripheral I/O devices such as a key pad or keyboard, a mouse, or a joysticks. The processor runs under the control of the operating system, which may be practically any operating system known to the art. The application is invoked by the operating system upon power up, reset, or both, depending on the implementation of the operating system.

Some portions of the detailed descriptions herein are presented in terms of a software implemented process involving symbolic representations of operations on data bits within a memory in a computing system. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, data, elements, symbols, instructions, characters, terms, numbers, or the like. It should be borne in mind, however, that all of these and similar terms are to be associated with the appropriate physical quantities and are merely convenient labels applied to these quantities. Furthermore, the actions and processes of an electronic device that manipulate and transform data represented as physical (electronic, magnetic, or optical) quantities within some electronic device's storage into other data similarly represented as physical quantities have been denoted by terms such as "processing," "computing," "calculating," "comparing," "determining," "displaying," and the like. Note also that the software implemented aspects of the invention are typically encoded on some form of program storage medium or implemented over some type of transmission medium. The transmission medium may be twisted wire pairs, coaxial cable, optical fiber, or some other suitable transmission medium known to the art. The invention is not limited by these aspects of any given implementation.

In another embodiment of the present invention, a method for producing hydrogen is provided. The method includes producing a reformate comprising hydrogen and an impurity in a fuel processor. The production of such a reformate is described in detail above and is not repeated here. The reformate produced by a fuel processor can have fluctuations in pressure and/or flow rate and the method includes reducing these fluctuations. The reformate is compressed in a compression unit to produce a compressed reformate as is described herein. The step of reducing the fluctuations in pressure and/or flow rate can include one or more of buffering the reformate prior to compressing it, and providing a controlled flow of a supplemental fluid to an inlet of the compression unit. A controlled flow of supplemental fluid can be provided to the inlet of the compression unit by directing the supplemental fluid through a conduit having a variable-opening valve. Such a method can optionally include sensing the pressure and/or flow rate of the reformate at the inlet of the compression unit and controlling the flow of supplemental fluid through the conduit in response to the sensed pressure and/or flow rate. During start up, shut-down and other significant fuel processor transients, the method can include adjusting power to the compression unit to prevent the formation of a vacuum at the inlet of the compression unit. Impurity is removed from the compressed reformate in a purification unit to produce a hydrogen-enriched reformate. Optionally, the method can include the step of controlling the flow of hydrogen-enriched reformate out of the purification unit.

Impurity can be removed from the reformate through selective adsorption, and in particular, through the use of a PSA unit as is described above. Impurity is removed by directing a flow of reformate through one or more of a plurality of adsorbent beds for an adsorption period. The removal of impurity from a flow of reformate in a PSA unit depends on design and materials of the PSA, the flow rate and composition of the reformate as well as the pressure within the PSA. Typically, the flow of reformate from a fuel processor to the adsorbent beds of a PSA unit is between about 150 slpm and about 370 slpm, where standard units represent 25° C. at 1 atm. The composition of the reformate can vary but will typically include $CO<1\%$, $CH_4<2\%$, $CO_2>15\%$ and $H_2>40\%$. The pressure within the PSA unit should be between about 70 psig and about 350 psig, but preferably less than about 200 psig, Moreover, the pressure within the PSA preferably fixed or stable while the PSA unit is removing impurity from the reformate. When the PSA unit is properly adjusted, a hydrogen-enriched reformate having a hydrogen concentration of at least about 99.90% by volume, can be produced at a rate of between about 40 slpm and about 120 slpm.

The PSA unit can be operated in response to a sensed data generated from sensing the hydrogen enriched reformate exiting the PSA or in response to a calculated flow of reformate determined from a process model of the fuel processor. The PSA unit preferably comprises a valve assembly capable of selectively controlling the flow of reformate to the plurality of adsorbent beds and a variable speed motor for creating rotation between the valve assembly and the plurality of adsorbent beds. In such an embodiment the adsorption period can be adjusted by changing the speed of the motor. The speed of the motor for producing a hydrogen product having the desired purity and flow rate is design specific. In the case of a Questair H3200 series model PSA, the speed of the variable speed motor is preferably selected and adjusted within a range between about 3 to about 11 rpm to achieve the composition and flow rates noted above.

Optionally, the method can further include the steps of compressing the hydrogen-enriched reformate in a second compression unit to produce a compressed hydrogen-enriched reformate, storing at least a portion of the compressed hydrogen-enriched reformate in a storage unit, and providing a controlled flow of the compressed hydrogen-enriched reformate to an inlet of the second compression unit. The step of providing a controlled flow of a compressed hydrogen-enriched reformate to the inlet of the second compression unit can comprise directing a flow of the compressed hydrogen-enriched reformate through a second conduit having a variable-opening valve. Such a method can optionally include sensing the hydrogen-enriched reformate at the inlet of the second compression unit to produce enriched reformate data, and controlling the flow of compressed hydrogen-enriched reformate in response to the enriched reformate data.

In still another embodiment of the present invention, a method for producing hydrogen is provided. The method includes the steps of producing a reformate comprising hydrogen and an impurity in a fuel processor. The production of such a reformate is described elsewhere herein. The reformate can have fluctuations in pressure and/or flow rate and the method includes reducing those fluctuations. The reformate is compressed in a compression unit to produce a compressed reformate. The step of reducing the fluctuations in pressure and/or flow rate can include one or more of buffering the reformate prior to compressing it, and providing a controlled flow of compressed reformate to an inlet of the compression unit. A controlled flow of compressed reformate can be provided to the inlet of the compression unit by directing the compressed reformate through conduit having a variable-opening valve. Such a method can optionally include sensing the pressure and/or flow rate of the reformate at the inlet of the compression unit and controlling the flow of compressed reformate through the conduit in response to the sensed pressure and/or flow rate. During start up or following turn downs of the fuel processor, the method can optionally include incrementally increasing power to the compression unit. The method includes storing the compressed reformate in a storage unit.

DETAILED DESCRIPTION OF THE FIGURES

An apparatus 1 of the present invention includes fuel processor 10, compressor 15, and pressure swing adsorption unit ("PSA") 20. A feed stream 5 feeds reactants to fuel processor 10 where they are converted to a reformate comprising hydrogen and one or more impurities. The reformate produced by fuel processor 10 is passed to compressor 15 via line 12. Compressor 15 compresses the reformate to produce a compressed reformate that passes through line 18 to PSA 20. Branching from line 18 intermediate the compressor 15 and PSA 20 is conduit 23. Conduit 23 is capable of providing a controlled flow of compressed reformate to the inlet of the compressor. Valve 25, located within conduit 23, is provided for controlling the flow of compressed reformate to the inlet of the compressor. PSA 20 receives at least a portion of the compressed reformate from compressor 15 and produces a hydrogen-enriched reformate by separating impurities from the compressed reformate. The hydrogen-enriched reformate passes out of PSA 20 through line 22 for subsequent storage and/or use. Conduit 24 branches from line 22 downstream of the PSA for providing a controlled flow of hydrogen-enriched reformate to the inlet of compressor 15. As illustrated, conduit 24 has valve 30 for controlling the flow of hydrogen-enriched reformate to the inlet of the compressor.

During operation, the reformate exiting the fuel processor through line 12 is monitored as the pressure and/or flow rate of reformate typically fluctuates. If the pressure or flow rate of the reformate should drop below a predetermined level, a flow of compressed reformate enters line 12 from conduit 23 and/or a flow of hydrogen-enriched reformate enters line 12 from conduit 24. Valves 25 and 30 in the conduits are operated in response to the sensed pressure and/or flow rate of reformate in line 12. Although FIG. 1A is illustrated as having two conduits 23 and 24, it should be noted that either of conduits 23 or 24 alone could be sufficient for maintaining pressure in line 12. In addition, as is illustrated in FIG. 1B, the conduits 23 and 24 can be combined so that mixtures of compressed reformate and hydrogen-enriched reformate are recirculated to the inlet of compressor 15 through a common conduit 32.

FIG. 1B illustrates an apparatus of the present invention having a fuel processor 10, compressor 15 and PSA 20. PSA 20 has an outlet connected to line 22B for directing hydrogen-depleted reformate out of the PSA. Line 22B directs the hydrogen-depleted reformate to vent 35, a combustor such as an anode tail gas oxidizer, storage or other processing depending upon the composition of the hydrogen-depleted reformate. PSA 20 also has an outlet connected to line 22A for directing a hydrogen-enriched reformate to downstream storage 40 and/or end use. Where the fuel processing apparatus includes conduit 24 for recirculating a flow of hydrogen-enriched reformate to the inlet of compressor 15, conduit 24 branches from line 22A so that a hydrogen-enriched reformate rather than a hydrogen-depleted reformate is directed to the compressor.

FIG. 2 illustrates an apparatus 202 having fuel processor 210, compressor unit 215, and PSA 220. Feed stream 205 feeds reactants to fuel processor 10 where they are converted to a reformate comprising hydrogen and one or more impurities. The reformate produced by fuel processor 210 is passed to compression unit 215 via line 212. Compression unit 215 comprises compressors 215A and 215B and it is envisioned that the compression unit can include additional compressors depending on the pressure requirements of PSA 220. Compression unit 215 compresses the reformate to produce a compressed reformate that passes through line 218 to PSA 220. Branching from line 218 intermediate the compression unit 215 and PSA 220 is conduit 223. Conduit 223, and valve 225 located within conduit 223, are capable of providing a controlled flow of compressed reformate to the inlet of the compression unit. PSA 220 receives at least a portion of the compressed reformate from compression unit 215 and produces a hydrogen-enriched reformate by separating impurities from the compressed reformate. The hydrogen-enriched reformate flows out of PSA 220 through line 222A for subsequent storage and/or use. Conduit 224 branches from line 222A downstream of the PSA for directing a controlled flow of hydrogen-enriched reformate to the inlet of compression unit 215. As illustrated, conduit 224 has valve 230 for controlling the flow of hydrogen-enriched reformate to the inlet of the compressor.

During operation, the pressure and/or flow rate of the reformate exiting fuel processor 210 through line 212 is monitored by sensor 245. The sensed data is relayed to system controller 250, as indicated by broken line 252, for use in determining if the reformate pressure and/or flow rate needs adjustment. The controller 250 communicates signal(s) to valves 225 and/or 230, as indicated by broken lines 256 and 254, respectively, to control the flow of compressed reformate through conduit 223 and hydrogen-enriched reformate through conduit 224. More specifically, if the pressure or flow rate of the reformate should drop below a predetermined level, a flow of compressed reformate enters line 212 from conduit 223 and/or a flow of hydrogen-enriched reformate enters line 212 from conduit 724.

Figure 3:
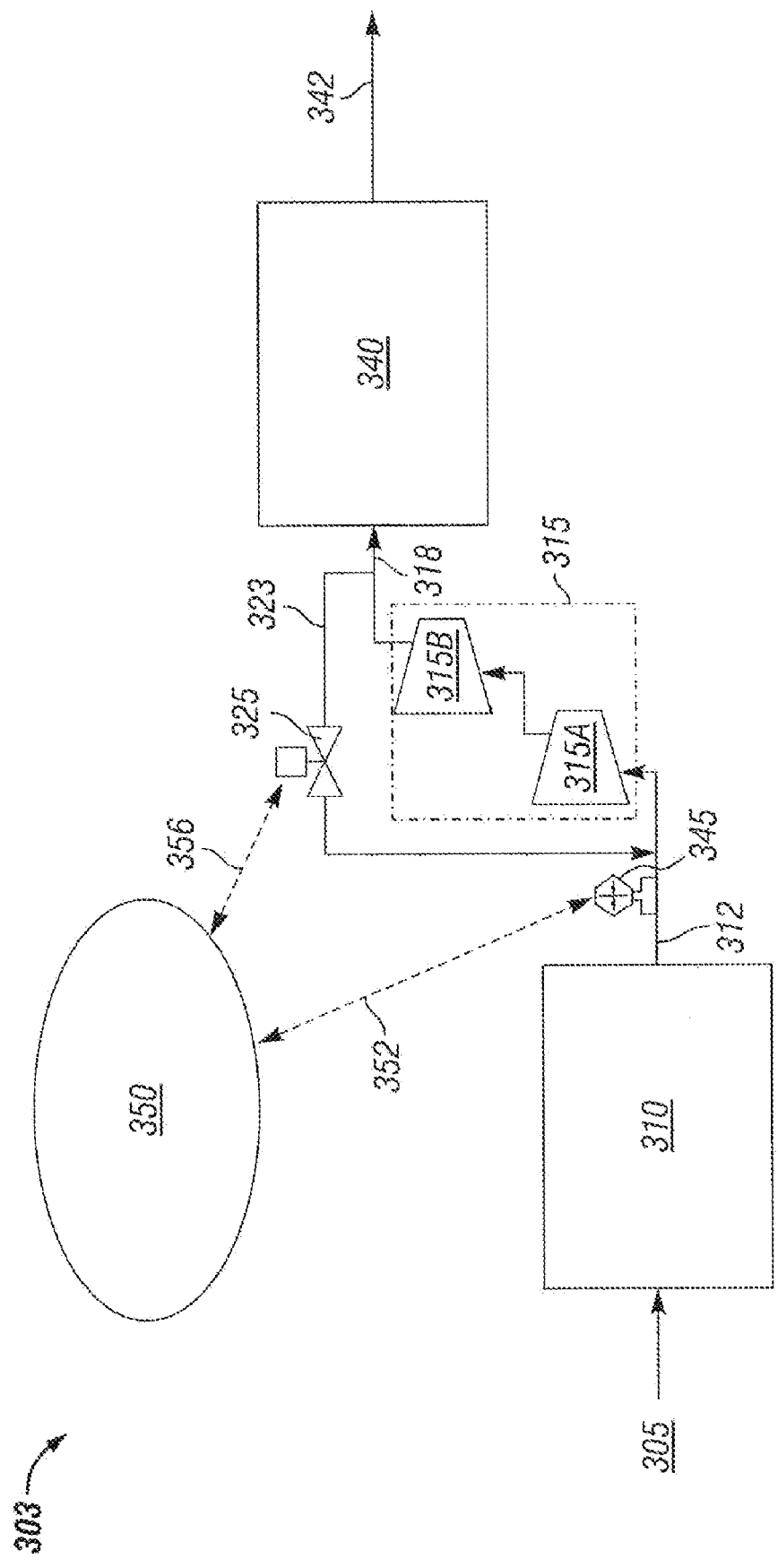
FIG. 3 is a schematic illustration of an embodiment of the present invention having a fuel processor and a hydrogen storage unit.

FIG. 3 illustrates a fuel processing apparatus 303 of the present invention including a fuel processor 310, a compression unit 315 and a hydrogen storage unit 340. Feed stream 305 feeds reactants to fuel processor 310 where they are converted to a reformate comprising hydrogen and one or more impurities. The reformate produced by fuel processor 310 is passed to compression unit 315, which can include two or more compressors 315A and 315B, via line 312. Compression unit 315 compresses the reformate to produce a compressed reformate that passes through line 318 to hydrogen storage unit 340. Branching from line 318 intermediate the compression unit 315 and storage unit 340 is conduit 323. Conduit 323, and valve 325 located within conduit 323, are capable of providing a controlled flow of compressed reformate to the inlet of the compression unit. Storage unit 340 receives and stores at least a portion of the compressed reformate from compression unit 315. Stored reformats can then be directed from the storage unit via line 342 for subsequent use as needed.

During operation, the pressure and/or flow rate of the reformate exiting fuel processor 310 through line 312 is monitored by sensor 345. The sensed data is relayed to system controller 350, as indicated by broken line 352, for use in determining if the reformate pressure and/or flow rate need adjustment. The controller 350 communicates signal(s) to valve 325, as indicated by broken line 356, to control the flow of compressed reformate through conduit 323. More specifically, if the pressure or flow rate of the reformate should drop below a predetermined level, a flow of compressed reformate enters line 312 from conduit 323.

Figure 4:
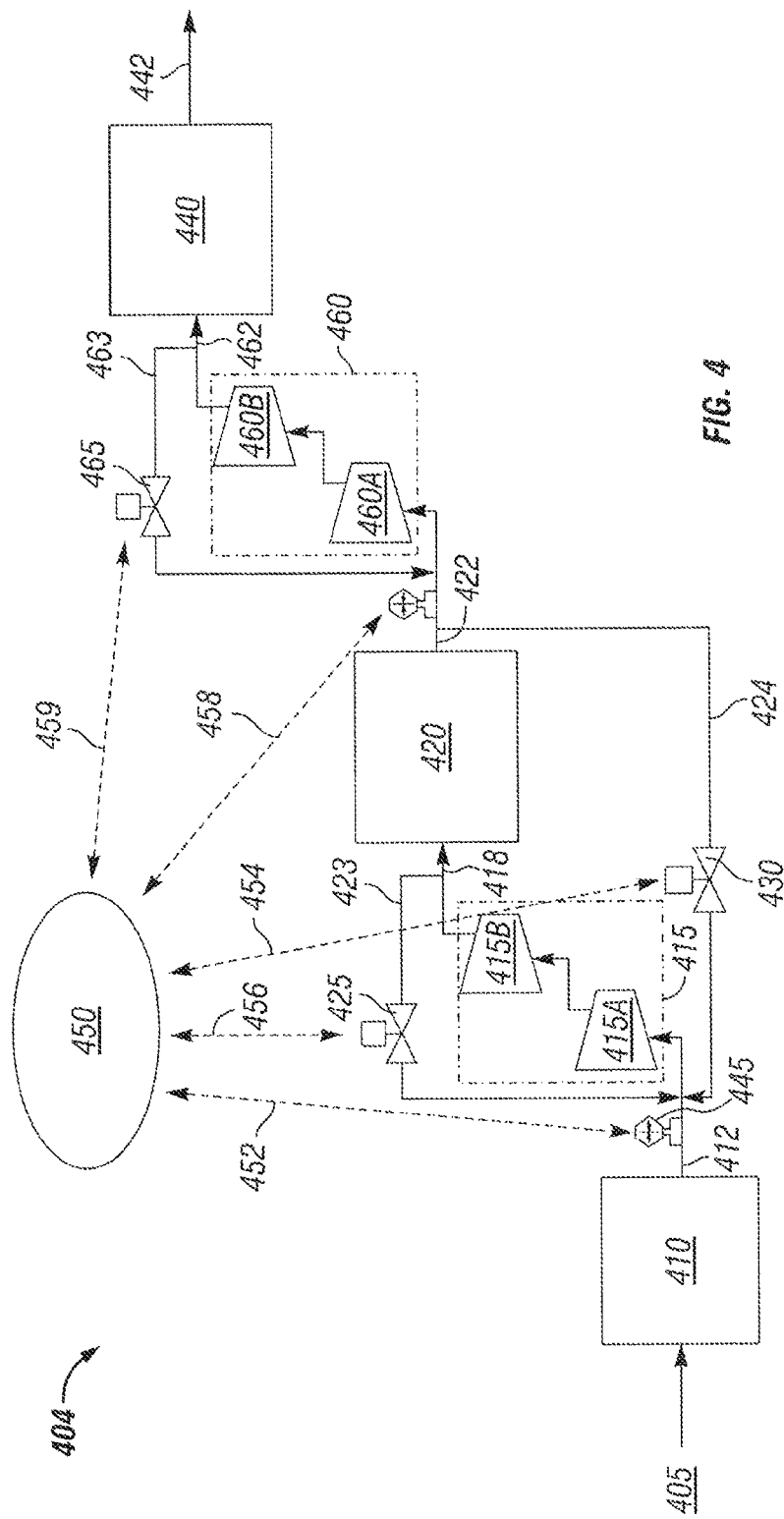
FIG. 4 is a schematic illustration of an embodiment of the present invention having a fuel processor, a pressure adsorption unit and a hydrogen storage unit.

FIG. 4 illustrates a fuel processing apparatus 404 that includes fuel processor 410, compression unit 415, PSA 420, second compression unit 460 and hydrogen storage unit 440. Feed stream 405 feeds fuel processor 410 where a reformate comprising hydrogen and one or more impurities is produced. The reformate produced by fuel processor 410 is passed to compression unit 415, which can include two or more compressors 415A and 415B, via line 412. Compression unit 415 compresses the reformate to produce a compressed reformate that passes through line 418 to PSA 420. Branching from line 418 intermediate the compression unit 415 and PSA 420 is conduit 423. Conduit 423 and valve 425 located within conduit 423, are capable of providing a controlled flow of compressed reformats to the inlet of the compression unit. PSA 420 receives at least a portion of the compressed reformate from compression unit 415 and produces a hydrogen-enriched reformate by separating impurities from the compressed reformate. The hydrogen-enriched reformate passes out of PSA 420 through line 422A and is directed to second compression unit 460 where the hydrogen-enriched reformate is compressed to form a compressed hydrogen-enriched reformate. The compressed hydrogen-enriched reformate is directed downstream via line 462 to hydrogen storage unit 440. Conduit 463 branches from line 462 intermediate the second compression unit 460 and the hydrogen storage Unit 440. As illustrated, conduit 463 has valve 465 for controlling the flow of hydrogen-enriched reformate to the inlet of the second compression unit 460.

During operation, the pressure and/or flow rate of the reformate exiting fuel processor 410 through line 412 is monitored by sensor 445. Similarly, the pressure and/or flow rate of hydrogen-enriched reformate exiting PSA 420 through line 422A is monitored by sensor 455. The sensed data from sensors 445 and 455 is relayed to system controller 450, as indicated by broken lines 452 and 458, respectively, for use in determining if the pressure(s) and/or flow rate(s) need adjustment. The controller 450 communicates signal(s) to valves 425 and 430, as indicated by broken lines 456 and 454, respectively, to control the flow of compressed reformate through conduit 423 and the flow of hydrogen-enriched reformate through conduit 424, respectively. In addition, controller 450 communicates signal(s) to valve 465, as indicated by broken line 459, to control the flow of compressed hydrogen-enriched reformate through conduit 463.

The particular embodiments disclosed above are illustrative only, as the invention may be modified and practiced in different but equivalent manners apparent to those skilled in the art having the benefit of the teachings herein. Such modifications can include but are not limited to the use of two or more purification stages, the use of other purification technologies, e.g., hydrogen selective membranes, and the use of other mechanisms for controlling the flow of fluid(s) through the various conduits. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for producing hydrogen, comprising:
a fuel processor for converting a fuel to a reformate comprising hydrogen and an impurity, the reformate having fluctuations in pressure and/or flow rate;
means for reducing the fluctuations in pressure and/or flow rate;

a compression unit downstream of the reformer for receiving the reformate and producing a compressed reformate; and a purification unit downstream of the compression unit for receiving at least a portion of the compressed reformate and producing a hydrogen-enriched reformate.

2. The apparatus of claim 1, wherein the means for reducing the fluctuations in pressure and/or flow rate comprise one or more of a buffer disposed intermediate of the fuel processor and the compression unit, and a conduit capable of providing a controlled flow of a supplemental fluid to an inlet of the compression unit, the supplemental fluid comprising compressed reformate, hydrogen-enriched reformate or mixtures thereof.

3. The apparatus of claim 2, wherein the conduit comprises an inlet downstream of the compression unit and a valve for controlling the flow of supplemental fluid through the conduit.

4. The apparatus of claim 2, wherein the purification unit comprises one or more of a hydrogen-selective membrane and a pressure swing adsorption unit.

5. The apparatus of claim 4, wherein the purification unit comprises a pressure swing adsorption unit having a first outlet for the hydrogen-enriched reformate and a second outlet for a hydrogen-depleted reformate.

6. The apparatus of claim 5, wherein the conduit comprises an inlet in fluid communication with the first outlet of the pressure swing adsorption unit.

7. The apparatus of claim 1, wherein the compression unit comprises means for regulating power to the compression unit.

8. The apparatus of claim 2, further comprising a sensor for sensing the reformate at an inlet of the compression unit to produce sensed data, and wherein the conduit comprises a valve having a variable opening operated in response to the sensed data.

9. The apparatus of claim 1, further comprising a product valve disposed downstream of an outlet of the purification unit for controlling the flow of hydrogen-enriched reformate from the purification unit.

10. The apparatus of claim 1, further comprising a storage unit downstream of the purification unit for storing the hydrogen-enriched reformate.

11. The apparatus of claim 10, further comprising a second compression unit disposed intermediate the purification unit and the storage unit, the second compression unit capable of producing a compressed hydrogen-enriched reformate for storage in the storage unit.

12. The apparatus of claim 11, further comprising a second conduit capable of providing a controlled flow of the compressed hydrogen-enriched reformate to an inlet of the second compression unit.

13. An apparatus for producing hydrogen comprising:
a fuel processor capable of converting a fuel to a reformate comprising hydrogen and an impurity;
means for reducing fluctuations in pressure and/or flow rate of the reformate;
a compression unit downstream of the reformer capable of receiving the reformate and producing a compressed reformate; and
a storage unit downstream of the compression unit capable of receiving at least a portion of the compressed reformate and storing the compressed reformate.

14. The apparatus of claim 13, wherein the means for reducing fluctuations in pressure and/or flow rate of the reformate comprise one or more of a buffer disposed intermediate of the fuel processor and the compression unit, and a conduit capable of providing a controlled flow of compressed reformate to an inlet of the compression unit.

15. The apparatus of claim 13, wherein the compression unit comprises means for regulating power to the compression unit.

16. The apparatus of claim 13, wherein the storage unit comprises one or more of a high pressure vessel and a hydrogen-fixing material.

17. The apparatus of claim 14, further comprising a sensor for sensing reformate at the inlet of the compression unit, and wherein the conduit comprises a valve having a variable opening operated in response to the sensed pressure.

* * * * *